April 5, 1966    W. F. MARTIN    3,244,010
TEMPERATURE DEPENDENT DENSITY GRADIENT
Filed Nov. 23, 1962    2 Sheets-Sheet 1
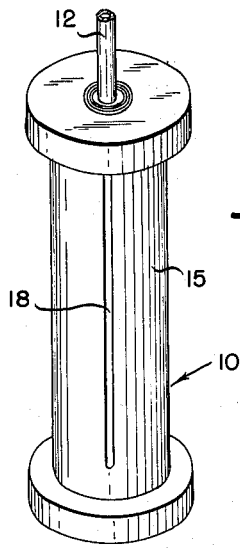
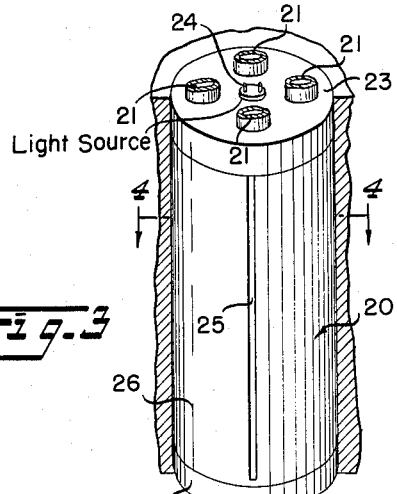
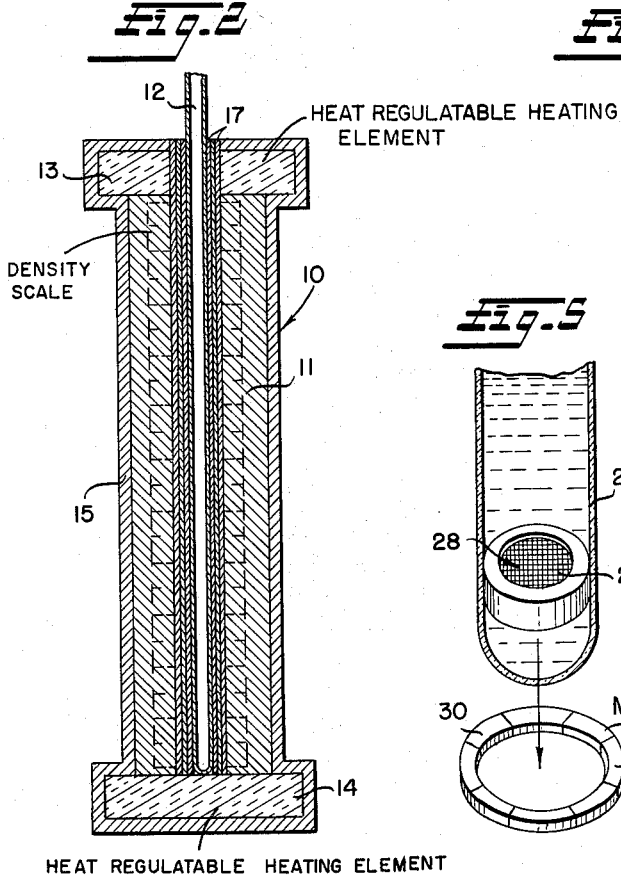
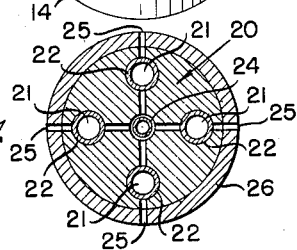
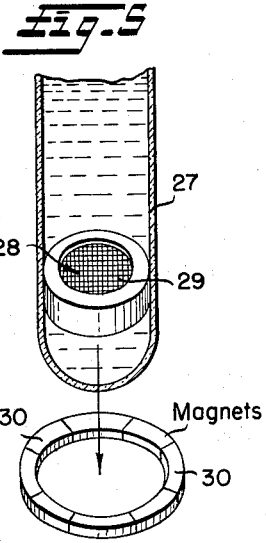
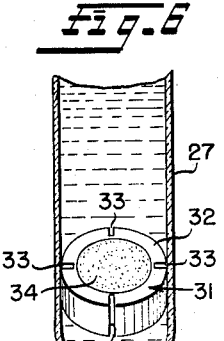
INVENTOR
William F. Martin
ATTORNEY

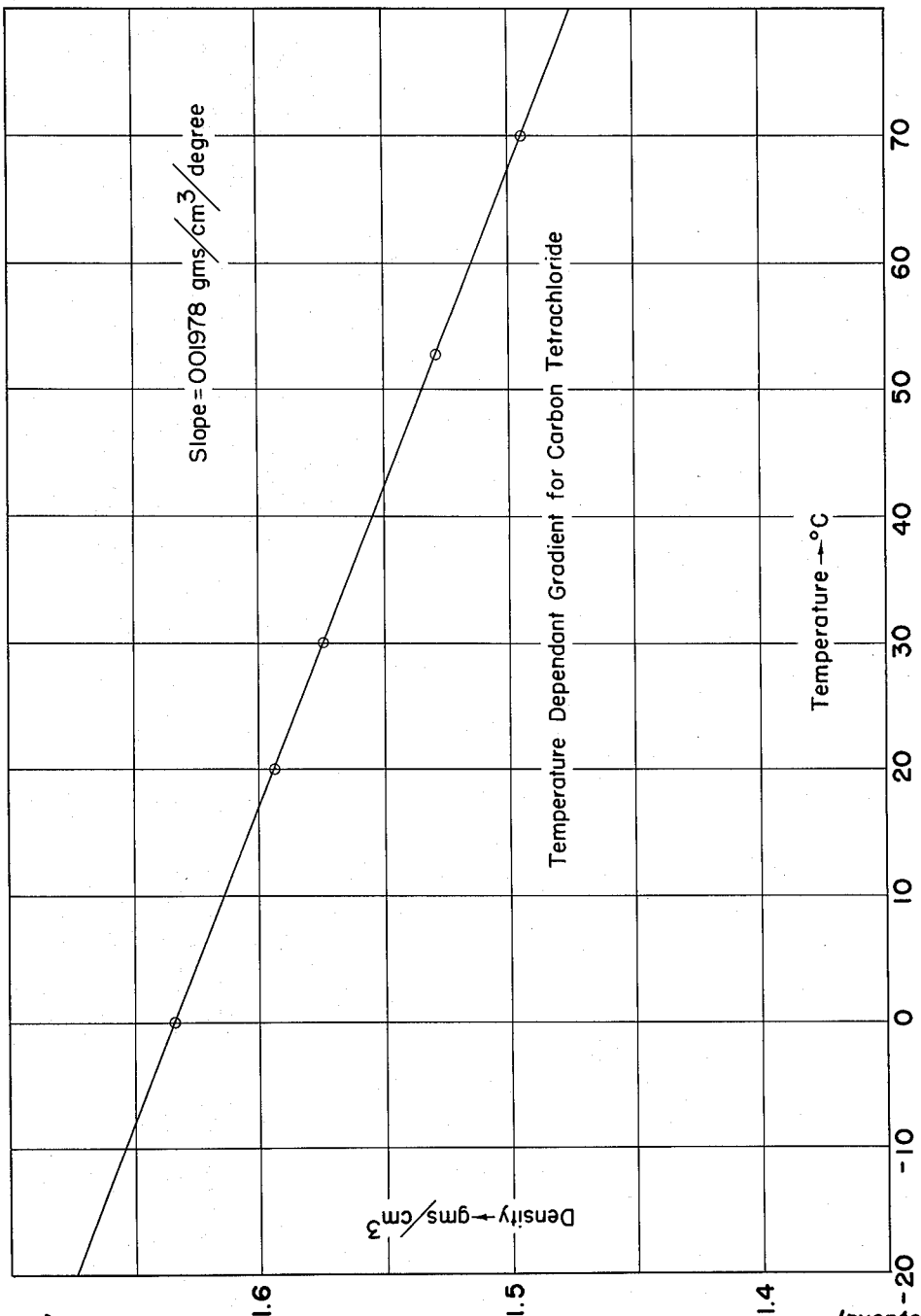

United States Patent Office 3,244,010
Patented Apr. 5, 1966

3,244,010
TEMPERATURE DEPENDENT DENSITY GRADIENT
William F. Martin, 1316 Galloway St. NE., Washington, D.C.
Filed Nov. 23, 1962, Ser. No. 239,581
7 Claims. (Cl. 73—437)

The present invention relates to an apparatus and method for determining the density and specific gravity of various objects, although it is not to be limited thereto. The apparatus of this invention and the principles thereof may be used for other purposes as will appear below.

In the past liquid columns having a gradient density have been useful analytical implements which were employed advantageously for the quick and convenient determination of the density or specific gravities of various materials, including solid and liquid materials. The liquid column, which is generally contained in a vertical tube, usually has the density of the liquid varying from a high density at the bottom of the liquid column to successively lower densities toward the top of the liquid column, or at progressively higher heights therein. Such columns which are frequently known as density gradients, indicate the density or specific gravity of the materials which are immersed in the column due to their floating in suspension, with equilibrium buoyancy, at a point or position in the column at which the specific gravity or density of the liquid in the column and that of the immersed material is in correspondence.

In operation a sample of the material or object upon which it is desired to determine the density or specific gravity thereof is immersed in the liquid column and sinks downwardly therein until a depth is reached at which point or position in the liquid column the density of the object corresponds to the density of the liquid. As long as the density gradient of the liquid in the column remains constant, the sample of material remains stationary at its equilibrium buoyancy point and its density or specific gravity is given by prior calibration of the liquid column with material of known density or specific gravity.

Heretofore, relatively few methods for preparing density gradients in liquid columns have been in use. Methods in use and all known methods proposed prior to this invention relate to a composition dependent density gradient maintained at a fixed uniform temperature. That is, by the methods of the prior art a density gradient is produced in a liquid column by schemes which establish a progressive difference in the composition of the liquid at various heights in the column while the entire column is held at a fixed uniform temperature.

For instance, the conventional method of preparing a liquid column density gradient is to carefully stratify two or more miscible liquids having different compositions and densities in separate layers in a tubular vessel. The liquid composition of highest density normally is at the bottom of the column and succeeding layers are carefully added in decreasing order of density. Initially the characteristics of the density gradient are a step function. Diffusion at the interface of each layer causes a gradual change in the gradient characteristics which lead ultimately to the destruction of the gradient unless elaborate means are taken to forestall the effect of diffusion.

This common method of liquid column density gradient preparation is tedious and time consuming. Composition dependent density gradients suffer from non-linearity, are hard to reproduce and their density gradient characteristics are uncertain. The inconstancy of the density gradient makes frequent calibrations necessary and ultimately forces discarding the column and preparation of a new one.

The physical principles underlying composition dependent density gradient methodology point to further disadvantages, which are also realized in practice. For example, rapid passage of samples down through the liquid alters the gradient to an undeterminable degree. Efforts to retrieve samples from the column drastically alters the existing gradient. Considerable time is required for diffusion to restore a disturbed gradient to a useful state. Extreme gradient fluctuations also cause the gradient in consequence of the nature of diffusion to follow a different path of development making subsequent comparisons with columns of similar original construction invalid. A further disadvantage of this method is that a temperature difference either in time or between columns produces a compound error in density comparisons. The compound error arises because specific volume and diffusion, both of which affect density, are temperature dependent.

There are various schemes which attempt to overcome some of the disadvantages of composition dependent density gradients either by accelerating the work of diffusion or by rendering the preparation of the columns less tedious but usually at a sacrifice of sensitivity and reproducibility. Also, some methods claim to improve the linearity and stability of the gradients.

Thus, so far is known, the prior art and practice relating to liquid column density gradients methodology has concerned itself exclusively with composition dependent density gradients and the concomitant disadvantages pointed out above.

It is among the principal objects of the present invention to provide a new apparatus and method for the preparation of liquid column density gradients which have many advantages over the methods of the prior art.

The method of the present invention provides a convenient means of establishing a controlled temperature gradient in a liquid column and using the resulting density gradient established in the liquid as a consequence of its differential thermal expansion for the determination and measurement of the density and specific gravity of various materials.

It is another object of the present invention to provide an apparatus and method that will perform all of the useful functions of the prior art practices relating to liquid column density gradients, and other density and specific gravity methods, in a more convenient, expeditious and scientific manner.

It is another object of the present invention to provide an apparatus and method for the determination of the density or specific gravity of a material in a liquid column density gradient by filling the liquid column with a single component liquid therein, thus eliminating the use of two separate liquids as used heretofore, and further varying the temperature of the liquid column so as to produce a temperature dependent density gradient in the single component liquid column.

It is yet another object of the invention to provide a method whereby the temperature for the entire length of a column of liquid is precisely controlled between predetermined temperatures in a progressive relationship so that the specific gravity, or density, of an object disposed in the liquid column can be established by the point at which it comes to rest in the density gradient established in the liquid as a result of its differential thermal expansion.

It is another object of the present invention to provide a method and apparatus by which a liquid column for determining the density and specific gravity of an object immersed therein has the temperature of the liquid column controlled between predetermined temperatures, which column is previously calibrated so that the level at which the object floats or reaches an equilibrium buoyancy corresponds to the density of the liquid in the column at this point and it is only necessary to read the calibrated density of the graduations or calibrations on a suitably placed scale at the point at which the object comes to rest to establish the density or specific gravity of the object therein.

It is another object of the present invention to provide a method and apparatus for determining the specific gravity and density of a material immersed in the liquid by the use of a single or multiple component homogeneous liquid in which the liquid is maintained at varying temperatures from one end of the liquid column to the other end and in which the liquid column, or tube, is previously calibrated to give the corresponding specific gravity or density of the object adjacent minute vertical levels, or increments, of the tube by the use of the differential thermal expansion of the liquid in the tube.

It is another object of the present invention to provide a method and apparatus for maintaining a controlled temperature gradient in a liquid column by establishing a thermal gradient between constant temperature sources, between the top and bottom of the liquid column or tube, so that the specific gravity or density of an object can be determined by observing the point at which an immersed object comes to rest.

It is a more particular object of the present invention to provide a novel apparatus consisting of a liquid column having a thermally induced temperature and density gradient therein bracketing the density or specific gravity of a class of objects.

It is another object of the present invention to provide a novel apparatus for containing a plurality of temperature dependent density gradients consisting of various ranges of density and specific gravity readings that overlap or extend beyond the approximate specific gravity or density range of the object being tested.

It is another object of the present invention to provide an apparatus for measuring the density and specific gravity of an object in a liquid column having a gradient density therein produced by a differential thermal expansion of a single, or multiple, component liquid in the column, and in which the apparatus may receive a number of different liquid columns therein for determining the specific gravity of different objects at the same time or simultaneously.

It is another object of the present invention to provide a novel apparatus housing a liquid column which contains a single, or multiple, component liquid therein in which liquid is contained in a tube, or the like, which is readily inserted and removed from the housing so that liquid tubes of various sizes may be utilized in a single housing, and means are provided for readily conducting the controlled heat from the heat sources through the interchangeable liquid tubes.

It is another object of the present inevntion to provide a method of utilizing a housing having a plurality of liquid tubes removably inserted therein, and light source means and slot means therein so as to enable a person to readily read the density or specific gravity of an object inserted in any one of the tubes by determining its level, or buoyancy, position therein in comparison with calibrations or graduations in proximity to the respective tubes.

It is another object of the present invention to provide a liquid column for determining the density or gravity of an object floated therein by the use of two or more miscible liquids, such as chloroform and benzene, for exple, as well as a single component liquid column having an adequate coefficient of expansion in which the density gradient between opposite ends of the column is controlled or regulated by heat means to produce a progressive (and preferably linear) temperature gradient and a corresponding specific gravity gradient through out the length of the column.

In carrying out the invention, regulated heat reservoirs or constant temperature sources preferably are provided at the top and bottom of the liquid column core although the principles of the invention can be practiced by locating them at intermediate locations. The top and bottom of this core should be in firm and uniform thermal contact with the upper and lower constant temperature sources. It is the function of the thermal gradient core to establish within its mass a stable temperature gradient between the regulated temperatures of the temperature sources. Customarily, heat conduction can be selected which will establish a linear gradient.

The temperature gradient can be made at the discretion of the operator either ascending wherein the temperature is lowest at the bottom of the core and rises gradually and uniformly to its highest value at the top of the core; or the thermal gradient can be made descending wherein the highest temperature is at the bottom and descends to the lowest temperature value at the top of the core.

For normal operation of the device for the determination of density and specific gravity by the methods of this invention an ascending temperature gradient is established in the thermal gradient core. This condition is achieved by regulating the upper temperature source at a higher temperature than the lower source. Means forming openings, called the gradient well, permit insertion of columnar tubes containing liquids. A pair of aligned slot means which may have a width approximately 20% of the gradient well diameter and having a length slightly less than the well is cut on opposite sides of the core to permit light to enter the gradient well from one side and visual inspection from the other.

When the apparatus of the present invention is operated, the linear temperature gradient established in the core produces by heat transfer the same temperature gradient in a column of liquid contained in the gradient well. The temperature gradient in the liquid column produces a concomitant density gradient as a result of the differential thermal expansion of the liquid column at the continuum of temperatures existing therein. As will be made evident later, a linear temperature gradient in a column of liquid will for most liquids produce a linear density gradient.

Various other objects and advantages of the present invention will be readily apparent from the following detailed description when considered in connection with the accompanying drawing forming a part thereof, and in which:

FIG. 1 is a perspective view illustrating one embodiment of the apparatus of the present invention;

FIG. 2 is a side elevation in section of FIG. 1 illustrating the apparatus of the present invention shown having a well therein for receiving a single tube or liquid column;

FIG. 3 is a perspective view partly broken away of another embodiment of the invention and illustrating an apparatus having a plurality of spaced openings therein for receiving several liquid column tubes;

FIG. 4 is a transverse section taken along line 4—4 of FIG. 3;

FIG. 5 is an enlarged fragmentary detail view illustrating perforated wafer filtering means in a liquid tube and means for causing the filtering wafer to be moved upwardly in the tube to remove any foreign bodies therein;

FIG. 6 is a fragmentary view similar to FIG. 5 disclosing a wafer having absorbent means therein for absorbing a liquid material that has had its specific gravity determined; and FIG. 7 is a plot of the temperature dependent density gradient for carbon tetrachloride.

Referring to the drawings and especially to FIGS. 1 and 2, the reference numeral 10 generally designates the apparatus for carrying out the invention provided with a vertical cylindrical member or sleeve 11 called the thermal gradient core which is composed of a good heat conducting material such as copper or aluminum and which is provided with a concentric bore or opening extending through it which forms a well for receiving a cylindrical glass tube 12 therein. As shown, the top and bottom of the core 11 are provided with regulated circular heat reservoirs 13 and 14 respectively, larger than sleeve 11, and may consist of a regulated electric heating or cooling device or both in combination or other equivalent temperature controlling means. Reservoir 13 is provided with a central bore or opening therethrough in alignment with the well in sleeve 11. The apparatus 10 is encased or enclosed within insulating material 15. It will be apparent the heat reservoir may be a liquid maintained at a predetermined desired temperature such as a water bath maintained at desired temperatures or may be a good heat conducting unitary solid block with embedded heat controlling elements. Such a block may be a rectangular parallelepiped containing a number of bores. The heat controlling elements may be embedded in the material of the thermal gradient core 11 with the ends functioning as heat reservoirs with a resultant shortening of the effective core length.

The main well opening of the sleeve 11 in FIG. 2 is substantially greater in diameter than the diameter of the glass tube 12 so that different size or diameter tubes 12 may be readily inserted and withdrawn from the sleeve 11. Ready heat transfer from the sleeve 11 to tube 12 is provided by a plurality of thin walled cylinders, shims or sleeves designated 17 inserted within the bore of the sleeve 11. Thus, the apparatus 10 provides an efficient unit for heating the tube 12 removably inserted therein so that the liquid within the tube 12 is properly heated and the density gradient of the liquid is properly controlled between the lower heat reservoir 14 and the upper heat reservoir 13 through the medium of the heat transfer sleeve 11 and the shims or thin walled cylinders 17, all of which are in abutting relationship or in contact with each other to provide a flow path for conducting and distributing the heat energy in accordance with the temperature settings of the upper and lower heat reservoirs.

The temperature gradient of the liquid in the glass tube 12 can be made in either direction, that is, it can have a high temperature adjacent the reservoir 13 which progressively diminishes or decreases down to the lower end of the sleeve 11 and the lower end of the tube 12 adjacent reservoir 14 which can be the low temperature reservoir. Preferably for the determination of the density and specific gravity by the method of the present invention, an ascending temperature gradient is established in the thermal gradient opening or bore of the sleeve 11. This condition is obtained by regulating the upper temperature heater or reservoir source 13 at a higher temperature than the lower source 14.

It will also be noted as best shown in FIG. 1 that narrow elongated slots, only one of which 18 is shown, are provided in the wall of sleeve 11. There is another slot which cannot be seen in the drawings directly opposite slot 18 and identical thereto which slots typically have a width approximately 20% of the diameter of the bore or well extending centrally through sleeve 11. These slots have a length slightly less than the length of the bore of sleeve 11 and are provided to permit light to enter the gradient well or bore from one side of the sleeve 11 and to permit visual inspection by a person from the other side or through the other slot.

When it is desired to measure the density or the specific gravity of an object, the tube 12 is first filled with a liquid having densities at is freezing and boiling points which bracket the sample material densities. The gradient liquid may be either a single component liquid such as chloroform, for example, or may be a mixture of two or more miscible liquids such as carbon tetrachloride and benzene bromoform and nitrobenzene or any other desired liquids having the bracketing densities. The tube 12 is filled to approximately 90% of the thermal gradient core length and placed in the core. The temperature settings appropriate to the sample material density range is obtained by the regulated heat reservoirs 13 and 14 by operating them to impart a temperature gradient to the apparatus and the liquid tube within a predetermined temperature range and thereby maintain a sensitive control over the density gradient characteristics in the liquid tube 12.

The liquid tube 12 has previously been graduated or calibrated by placing a vertically extending scale or markings thereon, or on a scale in proximity thereto, at different levels or increments so that when a given liquid or predetermined liquid is disposed into tube 12, and the temperature gradient from its low point adjacent the bottom of the tube to its high temperature point adjacent the portion of the tube at upper heater 13 is properly controlled between these predetermined temperatures, a concomitant density gradient will be established in the liquid as a consequence of its differential thermal expansion which will correspond to the density or specific gravity of the markings or graduations on the glass tube which can be observed by the operator.

The method of carrying out the mathematical calculations and marking the scale corresponding to different heights so that the operator can read the measurement of the specific gravity or the density of the liquid at any point along the glass tube is described hereinafter and is well known from scientific literature and tables.

When it is desired to determine the specific gravity of a liquid or a solid object by the method of the present invention and utilizing the apparatus shown in the drawings, it is only necessary to drop or insert the object into the upper end of tube 12 containing an appropriate liquid. Thereafter, the material will become immersed in the liquid and will gravitate, fall or float downwardly until it reaches a vertical level or point in the liquid column corresponding to the density gradient in the liquid. Thus, an unskilled operator can readily ascertain the specific gravity or the density of the material by this apparatus using well established automatic methods of controlling the temperature gradient in the liquid column which in turn controls and stabilizes the density gradient established in the liquid as a consequence of its differential thermal expansion.

The invention shown in FIG. 3 is substantially the same as that shown in FIG. 1 except that the thick aluminum sleeve 20 is provided with four circumferentially spaced cores or gradient wells 21 therein each adapted to receive an individual glass liquid tube 22 removably inserted therein. The lower heat reservoir 14 is substantially identical to that described for FIG. 1 while the upper heat reservoir 23 is provided with four apertures therein in alignment with individual bores or cores 21 of the sleeve 20 so that the tubes 22 may extend therethrough.

The sleeve 20 is provided with a central vertical bore so as to receive a light source 24 therein. The light source 24 emits its light through narrow elongated vertical slots 25 in communication with the bore of the light source adjacent their inner end, and which slots have their outer end or side portion in alignment with and extending approximately through the center of the spaced gradient wells 21 and beyond them and through the heat insulation 26 encasing the apparatus and the sleeve 20.

It is obvious that with this arrangement when the light source 24 is operated an observer can look through any of the slots 25 so as to easily observe the positions of sample materials suspended in the tubes 22 within the wells. With this arrangement a number of liquid columns can be readily inserted within the sleeve 20 in which all can be filled with the same single component liquid or a mixture of miscible liquids, to form liquid columns for measuring or determining the specific gravity or density of several objects immersed within the liquid tubes at the same time. For example, if an object is believed to fall within the brackets of the available density or specific gravity ranges or measurements of all the liquid tubes 22, this permits measurement of several objects in several of the tubes at the same time or simultaneously. Also, it is apparent that different tubes can be filled with different liquids of varying specific gravities to bracket a wider range or scope. One of the advantages of this apparatus or modification is that the different liquid tubes 22 may utilize different liquids therein so that if the specific gravity of an object to be measured falls outside of the range of one of the tubes 22, it can then be immersed in another tube 22 having a different liquid therein so that a different range of values of specific gravity is available, and so on.

Referring to FIGS. 5 and 6 the liquid glass tube 27 therein is provided with a cylindrical magnetic cup 28 therein provided with a perforated or screen portion 29 in the center and bottom thereof. The magnetic filtering cup is placed in and sinks to the bottom of the gradient tube before samples are placed in the column. Magnets spaced symmetrically around a circular opening of slightly larger diameter than the outside diameter of the tube 27 are provided so that the tube may be moved downwardly through the ring of magnets 30 as indicated by the direction of the arrow in order to move or lift the filtering cup 28 upwardly therein out the top of the tube in order to clean the column of sample material after density determinations have been made.

In another embodiment of the invention, illustrated in FIG. 6, an absorbent wafer having a density greater than that of the temperature gradient liquid is used to sweep the column clear of suspended liquid as the wafer sinks to the bottom of tube 27. For example, the circular wafer 31 therein may consist of an annular rim portion 32 provided with radial spaced slots 33 therein and an absorbent material 34 secured to the ring 32. The absorbent material 33 is selected so that as it moves downwardly in the tube, it absorbs a liquid sample suspended in the gradient liquid medium in the tube and thus sweeps this foreign matter to the bottom of the tube. In this way, the liquid may again be used to determine specific gravity, or density, of another liquid sample. The slots 33 permit the gradient liquid to pass above the wafer as it moves downwardly, since the absorbent material is more dense than the wire cloth 29 of the previously described wafer and will not permit passage of the gradient liquid.

The temperature dependent liquid column density gradients established by the method of this invention have certain advantages over gradient columns prepared by the methods of the prior art in that they are more readily and conveniently prepared, are more sensitive, stable, and reproducible and lend themselves to an ease of control over such gradient characteristics as density range, sensitivity, linearity, stability, and reproducibility heretofore unrealized in the prior art. Thus, in the present invention its method, in contrast to the trial and error procedures of the prior art, permits the calculation and prediction of the density gradient characteristics before the column is prepared. The data needed to calculate and predict the temperature dependent density gradient characteristics for many pure liquids and solutions is given in the scientific literature. The advantages of these features of the present invention over the prior liquid column density gradient methodology are evident in the following explanation.

The temperature dependent density gradient characteristics of a liquid can be graphically represented by plotting the density of the liquid at various fixed temperatures against the various temperatures. By the methods of this invention the necessary data to plot density vs. temperature graphs is obtained in the following manner.

The empirical relationship between temperature and volume for liquids generally given in scientific handbooks and critical tables can be readily converted into a density-temperature relationship by substituting for volume the equivalent density expression. When this is done the density-temperature equation below is obtained (1) $$D_t = \frac{D_o}{1 + at + bt^2 + ct^3}$$

where $D_t$ and $D_o$ are the density of the liquid at temperature $t$ and 0° C. respectively and $a$, $b$ and $c$ are empirically determined constants the numerical values of which are listed for many liquids in cubical expansion tables in the scientific literature. The temperature range over which Equation (1) is valid is also specified in the tables. The density of most liquids at some temperature within the specified temperature range is also readily obtainable from the scientific literature. Using Equation (1) and the indicated literature data the density of a given liquid at a sufficient number of temperatures to plot the density vs. temperature graph is obtained as follows:

The literature density value and temperature are substituted for $D_t$, and $t$ and the literature values for the constants $a$, $b$ and $c$ for the liquid are substituted in Equation (1). The equation is then solved for $D_o$. Assuming, as is the usual case, that the temperature for which the known density value is given is not 0° C. two points for a density vs. temperature graph for the liquid are thus at hand, i.e. the density at 0° C. and the temperature for which the density is given in the literature. Using the derived value of $D_o$ the density of the liquid at other temperatures can be readily calculated. By calculating the density of the liquid at a temperature in the middle and at the upper limit of the temperature range over which Equation (1) applies two addition points for the density vs. temperature graph are readily obtained. For most liquids the density-temperature relationship is linear and these four points more than suffice to draw the density vs. temperature graph over the complete range of temperatures specified. In any case departures from linearity are immediately apparent and additional points sufficient in number to define the shape of the curve can be readily calculated in the indicated manner. For example, the density of carbon tetrachloride at 20° C. is 1.594 gms./cm.$^3$ and the value of the constants $a$, $b$ and $c$ valid from 0° C. to 70° C. given in cubical expansion tables are $1.18384 \times 10^{-3}$, $8.9881 \times 10^{-7}$ and $1.35135 \times 10^{-8}$ respectively. Using this data and Equation (1) the following data for carbon tetrachloride is obtained:

| Temperature: | Density |
|---|---|
| 0° C. | 1.633 |
| 20° C. (literature values) | 1.594 |
| 30° C. | 1.575 |
| 70° C. | 1.495 |

FIG. 7 is a graph of these purely illustrative results. It is seen that the density gradient characteristics for many liquids are readily determinable by the methods of the present invention and it is a further fact that temperature dependent density gradients are usually linear with temperature. The characteristics of the temperature dependent density gradient for other liquids and miscible liquid mixtures can be determined in a like manner.

As hereinafter described, it is a relatively easy matter to prepare thermal gradient cores which produce linear temperature gradients. Liquids having a linear density-temperature relationship placed in linear cores will produce liquid column density gradients varying linearly. The slope of the density gradient with length is given by the product of the slope of the density vs. temperature plot and the slope of the temperature gradient in the core. As has been explained, the density vs. temperature plot is readily obtainable by the calculation methods described herein. The slope of the temperature gradient in the thermal gradient core will vary according to the temperatures to which the upper and lower temperature sources are set. It is this factor which permits convenient and sensitive control over the density gradient characteristics.

While conveniently variable the linear temperature gradient in the core when stabilized is easily determined by dividing the differences in the temperatures at which the sources are regulated by the length of the thermal gradient core. For example, if the gradient liquid is carbon tetrachloride, the core length 50 cm. and the upper and lower temperature sources are regulated at 70° and 0° C. respectively the slope of the density gradient in the carbon tetrachloride column is given by $$\frac{70°C.-0°C.}{50 \text{ cm.}} \times .002 \text{ gm./cm.}^3\text{/deg.} = .0028 \text{ gm./cm.}^3\text{/cm.}$$

In a further example, if the upper temperature is 50° C. and the lower temperature is 40° C. in the same 50 cm. core the slope of the density gradient is given by $$\frac{50°C.-40°C.}{50 \text{ cm.}} \times .002 \text{ gm./cm.}^3\text{/deg.} = .0004 \text{ gm./cm.}^3\text{/cm.}$$

The density ranges existing in the carbon tetrachloride column under the two sets of conditions given in the foregoing examples are both determined from the density vs. temperature plot of FIG. 7 and are for the first example 1.495 to 1.633 and for the second 1.535 to 1.555. Thus a simple centimeter scale placed in juxtaposition to such a liquid having a temperature dependent density gradients could be calibrated in terms of density.

In general, liquids with high temperature coefficients of expansion make superior gradient liquids. Wide differences between the temperature limits in the thermal gradient core produce relatively coarse wide range density gradients capable of accommodating a wide range of sample densities. Close temperature limits produce sensitive narrow range density gradients capable of resolving smaller density differences. The theoretical sensitivity achievable, for example, in a carbon tetrachloride column 100 cm. long having a one degree temperature gradient is such that it will separate particles differing in density by .00002 a distance of one centimeter. To achieve this sensitivity a highly stable gradient is required and temperature control throughout the length of the core should be of the order of .001° C.

In applying the methods of this invention to the determination of the density and specific gravity of various materials a liquid exhibiting no incompatibilities with the sample materials and having said density and temperature coefficient of expansion that indicates its density at the freezing and boiling point will bracket the densities of the sample materials is selected. Plots similar to those described may be prepared. If the density vs. temperature plot confirms the utility of the liquid for the density range of the sample material the gradient tube is filled to approximately 90 percent of the thermal gradient core length and placed in the core. The temperature settings appropriate to the sample material density range is also obtained from the density vs. temperature plot. At thermal equilibrium the sample material is immersed in the gradient liquid and the sample densities determined by noting their equilibrium buoyancy points on a linear scale calibrated in terms of the density of the liquid.

Temperature dependent density gradients can also be calibrated by observing the equilibrium buoyancy points of density standards made from materials with low temperature coefficients of expansion. It is contemplated that the temperature gradient existing in the thermal gradient core and gradient column can be calibrated by variously placing in close proximity to the gradient well or embedded in the walls of gradient tubes temperature indicators at intervals over the length of the core or tube. This invention further contemplates that rapid response temperature indicators can be caused to traverse the length of the column and thus provide a record of the continuum of temperature existing in the core and liquid column.

The relative density and specific gravity of small particles of solid materials such as glass, plastic, paint chips, light alloys, soil and other minerals, fibers, crystalline substances and others can be readily determined in the indicated manner. The density and specific gravity of liquid materials immiscible with the gradient liquid can be determined in an analogous manner. From liquid sample densities useful information relating for example, to the protein content of blood, and the solid content of other body fluids can be readily determined. The concentration of solute in various other solutions, the deuterium content of hydrogen isotope enriched water samples and the density of pure liquid substances can be as easily determined.

With liquid sample materials, wider gradient well diameters should be used and the sample should be carefully placed in the center of the gradient column to avoid adherence to the gradient tube walls. Sample adherence to the walls of the tube can be further minimized by coating the tube wells with substances that lower its adhesivity. Coalescence of successive samples can be avoided by placing samples in the column in decreasing order of density if this is known or by arrangements which divide the column up into vertical chambers. Or an absorbent wafer similar to that shown in FIG. 6 can be dropped into the column to sweep the column clear after each sample density determination. More discretion must also be used in the selection of a gradient liquid for liquid samples because of the higher temperature coefficient of expansion of liquid sample material.

It is apparent the method and apparatus described above gives the density of a sample material at the particular temperature of the liquid column at the point at which the sample comes to rest and that the temperature is different for each vertically displaced point in the column. There will be many applications in which the temperature of the sample will be of no concern so long as the temperature gradient in the column is held constant. For example, a TDDG (temperature dependent density gradient) column may be used to determine the relative order of densities of several samples of material without reference to temperature. Mixtures of particles can be fractionated according to density in a TDDG column without considering the temperature. Temperature considerations are also eliminated in a variety of applications requiring calibration of the column before use. Samples of synthetic and natural fibers for example, can be identified by comparing their rest points in a TDDG column with the rest points of known fibers. Columns can similarly be calibrated to identify plastics, minerals, glasses, light alloys, paint chips and other substances. Columns can also be calibrated to determine the concentration of a given component in an alloy or a mixed plastic, or the concentration of solute in a series of solutions without temperature entering the picture.

While all of the above uses are dependent on the density gradient existing in the TDDG liquid column it is not necessary to know the numerical value of the density or the temperature at any point in the column in order to obtain useful results. The one essential is that the temperature gradient and the liquid be the same for all results that are to be compared. Under such conditions knowing the relative position of samples in the column is about as useful as knowing their densities for qualitative and quantitative comparisons with known standards.

If necessary, the numerical value of the density of each sample object can be made apparent by calibrating the column with density standards and placing a suitable density scale near the column. In the absence of a calibrated density scale the sample density may be obtained from a plot of the density vs. temperature curve for the gradient liquid if the temperature at the sample rest point is known. (In a commercially feasible device the temperature at all points in the column will be easily determinable).

The sample density at other temperatures can be calculated if the temperature coefficient of cubical expansion is known for the sample material. If the coefficient of expansion is not known the average rate of change of density with temperature can be readily obtained for a sample object using the TDDG method. This quantity which is the negative of the coefficient of expansion can then be used to calculate to a close approximation the sample density at any desired temperature. To do this, one would have to determine the sample density in two gradient liquids having slightly different densities so that the density at two different temperatures is obtained for the sample object. The ratio of the difference in density found for the sample object to the temperature difference at the rest points in the two liquid columns is taken as the average change in density per degree centigrade.

For example, let $D_1$ and $T_1$ equal the density and temperature of the sample object at the rest point in the first gradient liquid and $D_2$, $T_2$ the density and temperature in the second liquid. The change in density per degree centigrade, $\Delta D/\Delta T$ is $$\Delta D/\Delta T = \frac{D_2 - D_1}{T_2 - T_1}$$

If $T_s$ is the temperature at which it is desired to know the density of the sample object, the $D_s$ can be determined from the following formula:

$$D_s = D_1 + \Delta D/\Delta T (T_s - T_1)$$

The present invention also provides a method for the convenient and expeditious determination and measurement of the temperature dependency of various physical properties and characteristics of solid, liquid and gaseous materials.

In the prior art it is customary to bring a sample of material to several fixed and constant temperatures in a series of distinct and separately performed operations and to measure the properties of interest at each temperature. By noting the change in the measured property at these distinct temperature intervals, an estimate of the temperature dependency of the property is obtained for the material concerned. All of these individually performed operations are tedious and laborious and require a competent scientific observer possessed of a high degree of manipulative skill. For example, in the prior art if one wishes to determine the temperature coefficient of expansion of a new liquid such as say a lubricating oil at temperatures ranging from the temperature of a cold internal combustion engine to the maximum temperatures reached when the engine is operating, it is conventional practice to fill precision pycnometers wtih a known volume of oil at a series of fixed temperatures throughout the temperature range of interest and obtain the weight of each of the thermostatically fixed volumes in the oil with a precision balance in a long sequence of separately performed and repetitive operations. The volume-temperature relationship for the oil can more conveniently be determined by the methods of the present invention as described below.

A gradient tube containing the lubricating oil is inserted into the gradient well of the device illustrated in FIG. 1. A series of density standards having a low temperature coefficient of expansion and having density ranges appropriate to the temperature dependent density gradient existing in the oil are immersed in the column, while the temperature gradient of the core is stabilized between the hot and cold temperature extremes of the engine. The equilibrium buoyancy positions of the density standards give the density of the oil at various temperatures within the selected temperature range. From this data the volume vs temperature graph can be readily plotted.

In further example, the radiant energy absorbence and transmittance of a dye solution can be readily determined at a continuum of temperature by the method of this invention by causing a radiant energy source and receiver in proper alignment on opposite sides of the gradient tube to traverse the tube while the dye solution contained therein is held between the desired temperature limits.

Temperature dependent properties can also be studied by the method of this invention by affixing suitable source and sensors to specially designed gradient tubes at intervals along the length of the tube.

Inasmuch as various changes may be made in the particular form, and arrangement of the apparatus and in the steps of the process and other sequences as disclosed without departing from the principles of the invention, it will be understood that the invention is not to be limited excepting by the scope of the appended claims.

What I claim is:

1. A method of determining the density of an object in a liquid column containing a fluid comprising, controlling the temperature of the fluid in the liquid column between predetermined temperatures from a predetermined temperature at one location to a different predetermined temperature at another location in a progressive sequence to establish a gradient density therein, and immersing the object in said fluid liquid column until it rests at a level in the column between said locations corresponding to the density of the object.

2. A method of determining the density of an object comprising immersing the object in a liquid column having known density measurement at predetermined temperatures, maintaining the temperature of the liquid column at progressively different temperatures between two locations in the liquid column, said progressive temperature being maintained between predetermined low and high temperatures whereby the object comes to rest at a level in the liquid column corresponding to the density of the object.

3. A method of determining the specific gravity and density of liquid and solid materials in a liquid column comprising maintaining the length of the liquid column between a lower and an upper location therein at progressively increasing temperatures from a predetermined lower temperature at the lower location to a higher predetermined temperature at the upper location to provide a specific gravity density gradient in the liquid by differential thermal expansion of the liquid, and immersing the object in said liquid column so it will remain suspended in equilibrium at a level therein between said locations corresponding to its specific gravity and density.

4. A method of determining the density and separating a plurality of objects in a liquid column comprising, controlling the temperature in the liquid column between predetermined temperatures from a predetermined temperature at one location to a different predetermined temperature at another location in a progressive sequence to establish a gradient density therein, and immersing the objects in said liquid column until they respectively come to rest at a level in the column between said locations corresponding to the density of the respective objects.

5. Apparatus for determining the density of an object and other uses comprising a heat conductive housing with a top and bottom provided with at least one elongated substantially vertical opening therein, liquid containing means disposed in said opening in thermal contact with said top and bottom and along the walls of said opening, temperature regulating means in contact with said housing in proximity to the top thereof, means to control the temperature of said temperature regulating means at a predetermined desired first temperature, a second temperature regulating means in contact with said housing in proximity to the bottom thereof, means to control the temperature of said second temperature regulating means at a second desired predetermined temperature different from said first desired predetermined temperature.

6. A device for determining the density of an object and for separating objects having different densities, comprising a heat conductive housing provided with a plurality of longitudinally spaced vertically disposed elongated bores therein, transparent removable fluid containers positioned in said bores in thermal contact with said top and bottom and along the walls of said bore, vertically disposed slots on opposite sides of said bores extending substantially the length of said bores, temperature regulating means in contact with said housing in proximity to the top thereof, means to control the temperature of said temperature regulating means at a predetermined desired first temperature, a second temperature regulating means in contact with said housing in proximity to the bottom thereof, means to control the temperature of said second temperature regulating means at a second desired predetermined temperature different from said first desired predetermined temperature.

7. The device of claim 6, wherein a density scale is mounted in proximity to said slots.

References Cited by the Examiner

UNITED STATES PATENTS

| | | | |
|---|---|---|---|
| 1,257,662 | 2/1918 | Young | 73—437 |
| 1,272,605 | 7/1918 | Becker | 73—437 |
| 1,386,340 | 8/1921 | Wurster | 210—359 |
| 1,407,666 | 2/1922 | Lehman | 165—61 |
| 1,706,250 | 3/1929 | Palmer | 210—359 |
| 1,723,454 | 8/1929 | Wulff | 73—293 X |
| 2,696,085 | 12/1954 | Ruff | 165—61 X |
| 2,778,220 | 1/1957 | Kuhlmann et al. | 73—57 |
| 2,825,698 | 3/1958 | Taylor et al. | 73—32 |
| 3,080,214 | 3/1963 | Duke et al. | 210—502 X |
| 3,109,084 | 10/1963 | Walsh | 219—385 |

RICHARD C. QUEISSER, Primary Examiner.

JOSEPH P. STRIZAK, JAMES J. GILL, J. W. MYRACLE, Assistant Examiners.